United States Patent [19]
DiStefano

[11] Patent Number: 5,909,791
[45] Date of Patent: Jun. 8, 1999

[54] SPRING CLUTCH

[76] Inventor: Carmelo Joseph Licciardi DiStefano, 6 Mercedes Drive, Thomastown, VIC 3074, Australia

[21] Appl. No.: 08/894,841
[22] PCT Filed: Jan. 31, 1997
[86] PCT No.: PCT/AU97/00054
 § 371 Date: Aug. 29, 1997
 § 102(e) Date: Aug. 29, 1997
[87] PCT Pub. No.: WO97/28384
 PCT Pub. Date: Aug. 7, 1997

[30] Foreign Application Priority Data

Feb. 2, 1996 [AU] Australia ................................ PN7835

[51] Int. Cl.⁶ .............................. F16D 41/20; F16D 43/20
[52] U.S. Cl. ........................ 192/223.4; 267/167; 267/180
[58] Field of Search ................................... 192/223.4, 43, 192/41 S, 81 C; 267/167, 180, 155; 464/40; 160/321

[56] References Cited

U.S. PATENT DOCUMENTS

| | | |
|---|---|---|
| 733,320 | 10/1904 | Haase, Jr. . |
| 2,487,280 | 11/1949 | Starkey . |
| 2,728,188 | 12/1955 | Hettich . |
| 2,742,126 | 4/1956 | Morton ................................ 192/41 S |
| 2,895,578 | 7/1959 | Winchell . |
| 3,177,995 | 4/1965 | Mason . |
| 3,372,781 | 3/1968 | Fulton . |
| 3,529,703 | 6/1968 | Kroeker . |
| 3,893,554 | 7/1975 | Wason . |
| 3,920,106 | 11/1975 | Nisenson . |
| 4,313,530 | 2/1982 | Boyd . |
| 4,318,314 | 3/1982 | Furedi et al. . |
| 4,341,293 | 7/1982 | Acevedo . |
| 4,433,765 | 2/1984 | Rude et al. . |
| 4,651,854 | 3/1987 | Harada ................................ 192/223.4 |
| 4,763,764 | 8/1988 | Smith . |
| 4,869,357 | 9/1989 | Batchelder ............................ 192/41 S |
| 5,170,871 | 12/1992 | Batchelder . |
| 5,314,053 | 5/1994 | Nishimura . |
| 5,375,643 | 12/1994 | Rude ................................ 192/41 S X |
| 5,507,374 | 4/1996 | Rude .................................... 192/223.4 |

FOREIGN PATENT DOCUMENTS

| | | |
|---|---|---|
| B-20397/83 | 1/1987 | Australia . |
| 1903239 | 7/1970 | Germany . |
| WO 82/03256 | 9/1982 | WIPO . |

OTHER PUBLICATIONS

Japanese Patent Abstract No. 07229524A, published Aug. 29, 1995.

Derwent Abstract No. 89–246909 for SU 1439–311–A, published Nov. 23, 1988.

Primary Examiner—Rodney H. Bonck
Attorney, Agent, or Firm—Finnegan, Henderson, Farabow Garrett & Dunner, L.L.P.

[57] ABSTRACT

A helical spring for a spring clutch including:
 (i) at least one right hand wound section (B);
 (ii) at least one left hand wound section (A); and
 (iii) tabs (2,3,4 & 5) projecting from both the right hand wound section and the left hand wound section.

24 Claims, 11 Drawing Sheets

SPRING CLUTCH

FIELD OF THE INVENTION

The invention relates to a spring for a spring clutch and, more particularly, for a spring clutch for use with rollers for blinds and the like.

BACKGROUND TO THE INVENTION

Whilst the following description discusses springs and spring clutches by illustration to their use with blinds, it should be understood that the invention is not so limited. Many designs of spring clutches have been manufactured in the past and in particular will be well known to persons skilled in the blind industry. Spring clutches are destined to provide a smooth translation of rotational movement of one shaft to another coaxial shaft. In the absence of such types of clutches, a direct translation is provided which can make the rotation difficult to initiate and control.

One known type of spring clutch has a first shaft, a helical spring and a second shaft. The helical spring has an internal diameter which is slightly smaller than the outer diameter of the first shaft. To install the spring, it is slightly expanded and slid onto the first shaft to grip the first shaft by frictional engagement. The second shaft is tubular and surrounds the first shaft with the helical spring interposed in between the shafts. The second shaft engages one end of the helical spring.

In use, the spring clutch may be mounted at one end of a blind roller so one of the shafts is fixed relative to the other. For example the first shaft is fixed and the second shaft is rotated by a pullcord engaging a pulley mounted upon one end of the first shaft. The second shaft is connected to the blind roller. Rotating the second shaft causes the helical spring to also rotate. Any resistance to rotation of the second shaft is first absorbed by rotational contraction of the helical spring and if the resistance exceeds a predetermined level the helical spring will slip about the first shaft. This ensures that excessive rotational torque in not applied to the roller blind and the blind will be smoothly rotated. Damage of the spring clutch can also be avoided.

Another type of spring clutch is disclosed in Australian Patent No. 557825. In this specification the problems of stairstepping and excessive torsional loading of spring clutches is discussed. A spring clutch is described which permits torque to be transmitted to the load (eg. a blind) in graduated steps to allow for a slower acceleration of the load than is the case when the maximum rated torque is applied suddenly to the load.

The spring clutch disclosed in that patent is characterised by having at least two helical springs frictionally engaging a first shaft. Each of the helical springs have tabs affixed to their ends which engage in openings in the surrounding coaxial second shaft. The openings have a configuration such that upon rotation of the first shaft, and consequently the helical springs, the tabs are sequentially engaged. This arrangement allows the first helical spring to contract to transmit torque to the second shaft prior to a second helical spring doing likewise. Further, the frictional engagement between the first helical spring and the first shaft is such that the second helical spring will not engage the second shaft unless the first helical spring is caused to slip about the shaft. This will occur if the torque applied to the first helical spring exceeds a predetermined limit. The second helical spring operates in a similar way as does a third helical spring and so on. Accordingly, a number of helical springs are sequentially used to transmit torque loads from the first shaft to the second shaft.

This patent also discloses a bidirectional spring clutch. To achieve this, both ends of each helical spring are provided with upstanding tabs. All the helical springs are provided with a common winding direction. Different ends are engaged depending upon the direction of rotation of the first shaft. A complex configuration of openings and barriers is necessary in the second shaft to achieve this functionality. Consequently such a bidirectional spring clutch is expensive to manufacture and assemble.

OBJECT OF THE INVENTION

It is an object of the invention to provide a bidirectional clutch which avoids the need for a plurality of helical springs and complex configuration of the second shaft.

SUMMARY OF THE INVENTION

According, to one aspect of the invention, there is provided a helical spring for a spring clutch including:
 (i) at least one right hand wound section;
 (ii) at least one left hand wound section; and
 (iii) tabs projecting from both the right hand wound section and the left hand wound section.

It has been surprisingly found that the use of a single spring of this configuration facilitates smooth transmission of rotational forces between the input and output shafts of a spring clutch.

A skilled person will understand that for the spring to operate in a spring clutch, the tabs of such a spring merely need to project from the respective sections so they can be contacted by the input and/or the output shafts. However, preferably the tabs project outwardly from those sections. Likewise, preferably the tabs are directed substantially radially.

At least two of the tabs may be axially offset from each other where sequential and/or bi-directional operation of a spring clutch is required. Similarly, at least two of the tabs may be axially substantially aligned to distribute the application of any force to the spring more evenly.

Preferably, the right hand wound sections and the left hand wound sections are positioned so that the spring has alternate left and right hand wound sections.

Preferably, at least one right hand wound section and at least one left hand wound section abut each other. In this arrangement, one of the tabs connects each abutting right hand wound section and left hand wound section.

In another aspect of the invention, a spring clutch is provided which uses the helical spring of the type described above. Typically, the spring clutch includes:
 (i) a first shaft;
 (ii) the helical spring of the type described above, frictionally engaging the first shaft: and
 (iii) a control means adapted to cause engagement or disengagement of the helical spring to or from the first shaft.

Preferably, the control means selectively moves one or more of the tabs to tighten or loosen the helical spring about the shaft. One example of the control means includes:
 (i) a second shaft rotatable to loosen the helical spring on the shaft; and
 (ii) a third shaft rotatable to tighten the helical spring on the shaft.

It has been surprisingly found that by using a helical spring having sections of opposing windings, that smooth transmission of rotational movement in either direction can be achieved in a spring clutch without adopting complex shapes for the tubular second shaft. More particularly, the helical spring will slip if the amount of load applied by the first shaft exceeds predetermined limits. Under these conditions the spring sections have unwound sufficiently from the first shaft to permit slippage. Of course, the sections can be designed to have engaging surfaces which permit sequential engagement with the second shaft.

It is also possible to increase or decrease the frictional engagement of the spring on the first shaft by shortening or lengthening the number of sections in the spring. Preferably, the spring has four sections which will occupy the substantial length of the first shaft The frictional engagement may be lessening in either or both directions by removing sections. In this way the feel of the blind rolling movement may be stiffened or softened as desired.

DESCRIPTION OF THE DRAWINGS

The invention will now be further illustrated by reference to the accompanying drawings in which:

In the figures, like numbers refer to like features.
(a) Description of the spring FIG. 1 depicts a helical spring 1 having three sections A, B and C. Each section shown is substantially identical and has seven windings, though any number of desired windings or coils may be selected depending upon the application of the spring, clutch. At the lower end of the helical spring 1 is a tab 2 which extends radially from the helical spring 1. The upper end of the helical spring 1 also has a tab 3 which extends radially from the helical spring 1.

Section A, B and C are connected by radially extending U shaped tabs 4 and 5. These tabs 4 and 5 are formed by reversing the direction of rotation of the helical spring 1 during its formation. Consequently the direction of the winding in section B is the opposite to the direction of winding of sections A and C.

Figure 1:
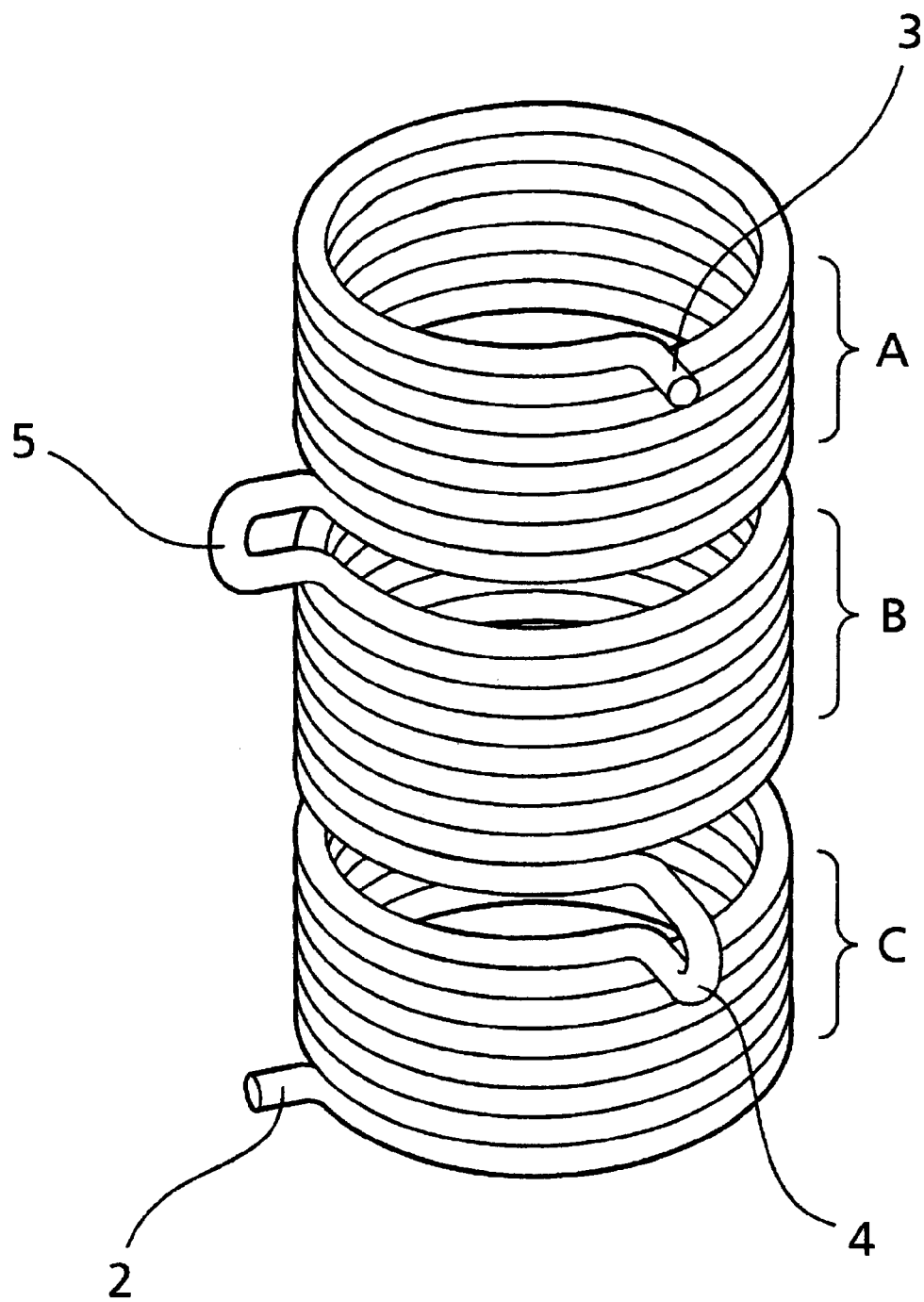
FIG. 1 is a perspective view of a spring according to one form of the invention.
Figure 2:
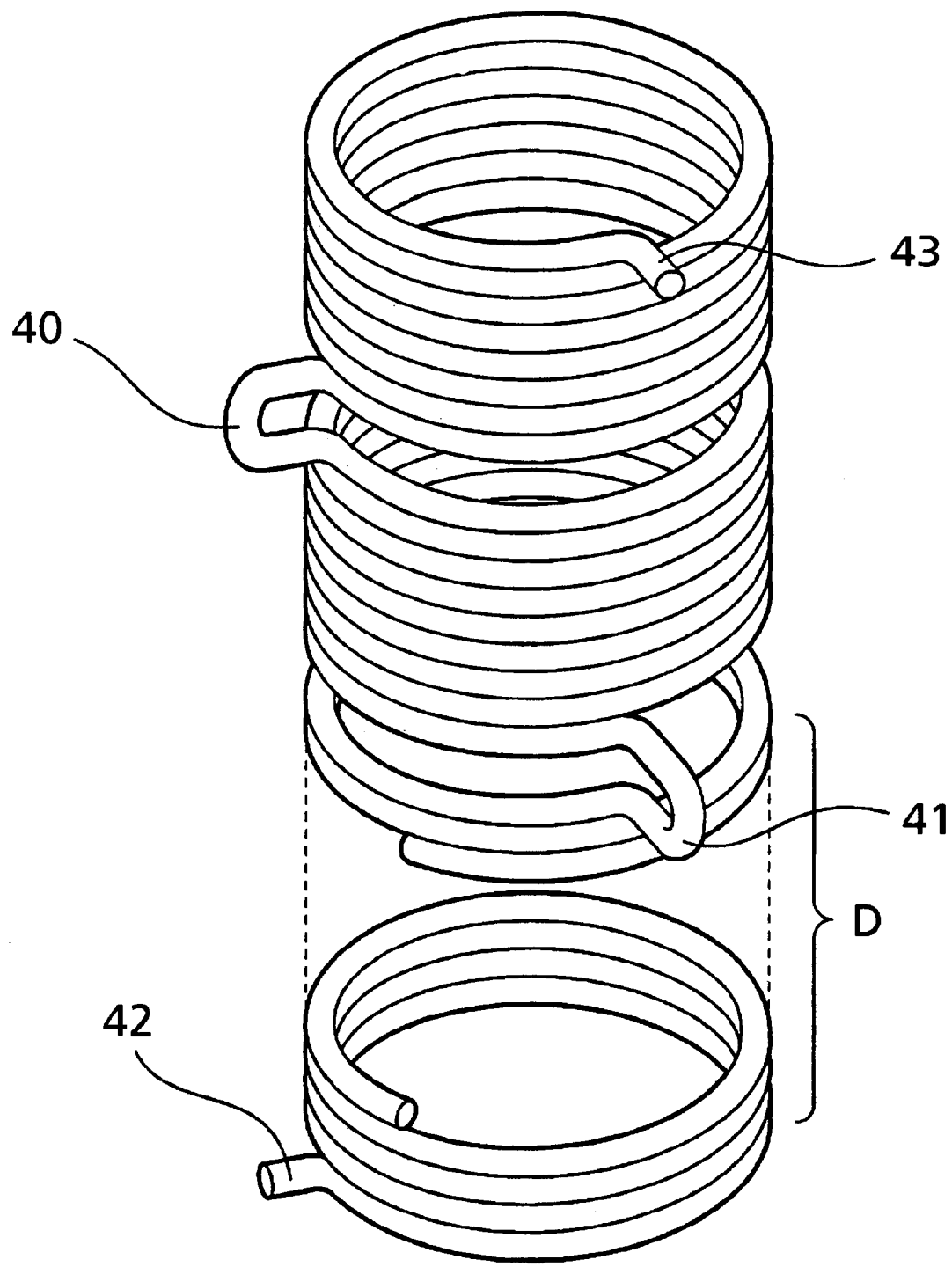
FIG. 2 is a perspective view of a spring of indefinite length according to another form of the invention.

FIGS. 2 to 5 show a similar helical spring to FIG. 1 except the spring is shown with broken lines in section D to depict that the spring can be of indefinite length. The number of winding sections may varying depending upon the application required to the helical spring 1. The winding sections are connected by radially extending U shaped tabs 40 and 41. These tabs 40 and 41 are formed by reversing the direction of rotation of the helical spring 1 during its formation and are axially aligned respectively with tabs 42 and 43 (as more clearly shown in FIG. 3). The direction of winding of the sections of indefinite length will alternate. Whilst in FIG. 3 the tabs are aligned, the person skilled in the art will appreciate that the tabs need not be in alignment.

Figure 3:
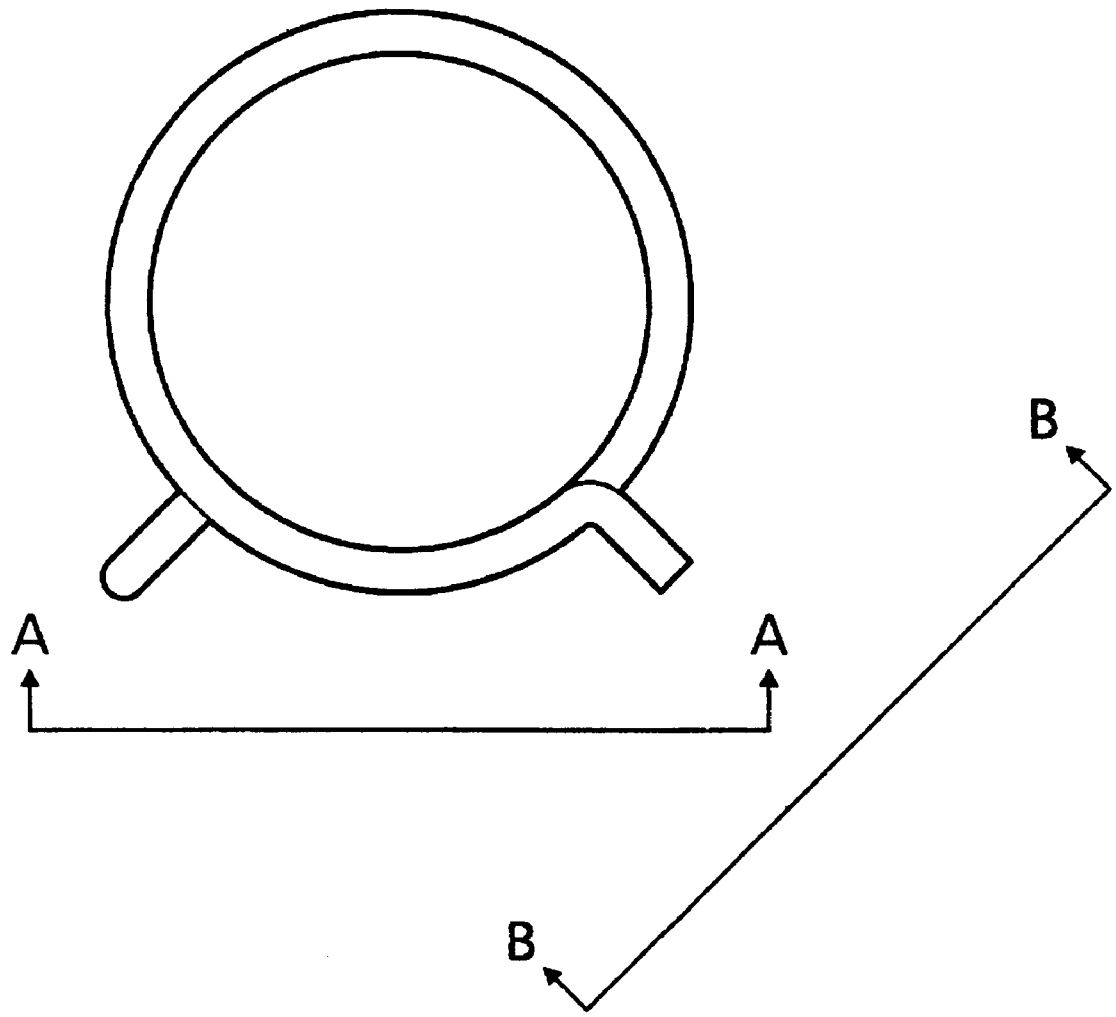
FIG. 3 is an end view of the spring of FIG. 2.
Figure 4:
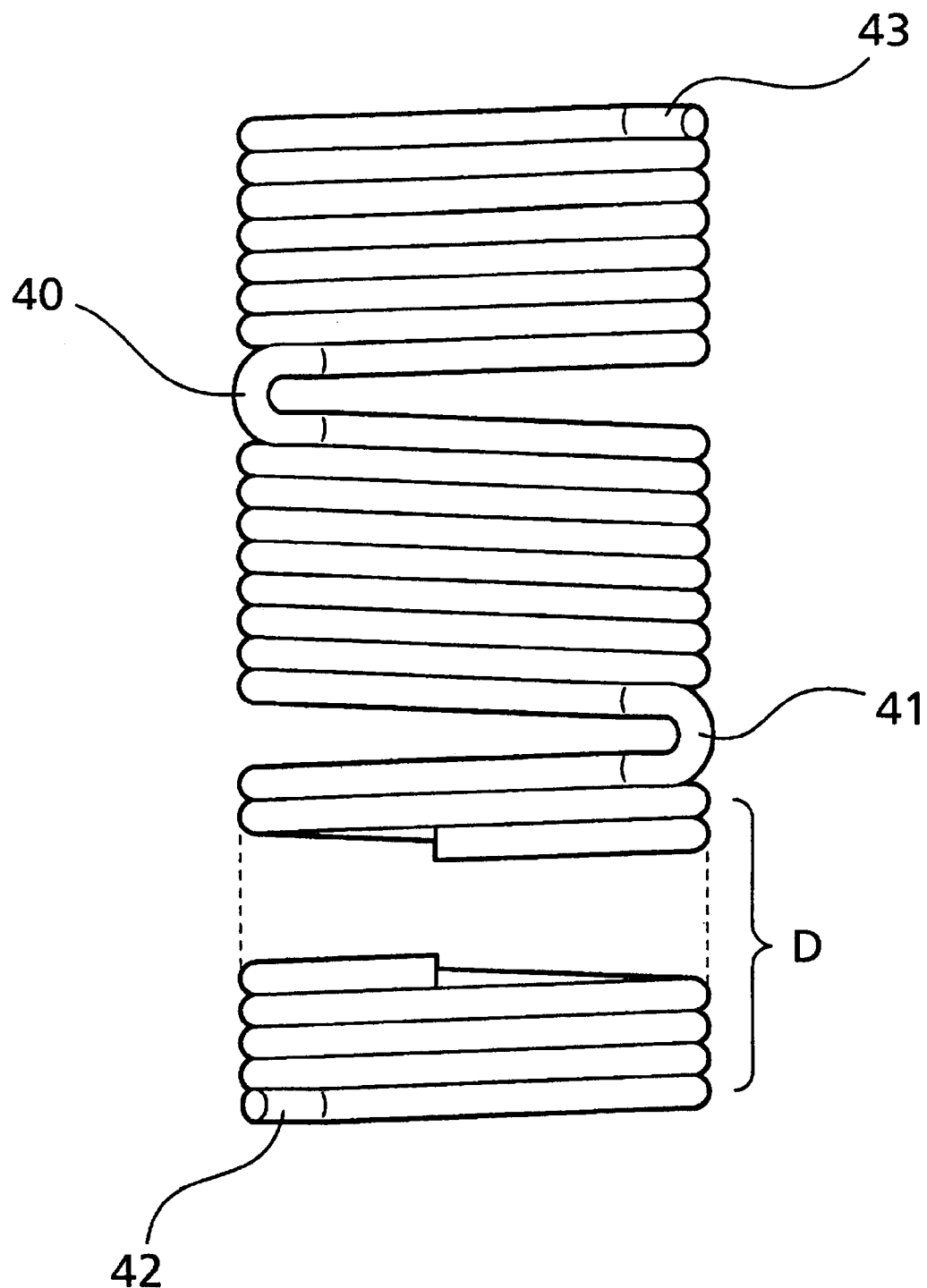
FIG. 4 is a view of the spring of FIG. 2 along A—A.
Figure 5:
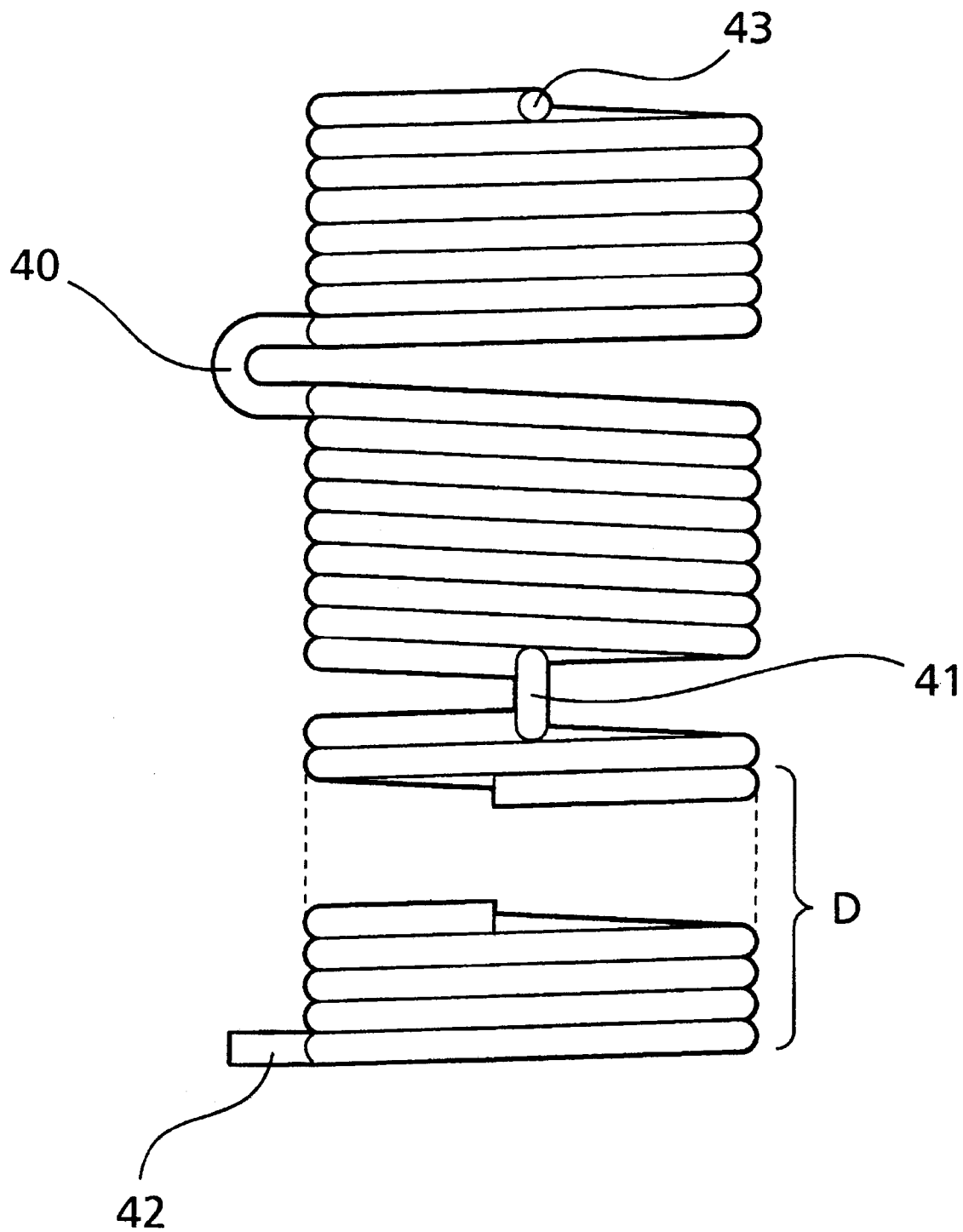
FIG. 5 is a view of the spring of FIG. 2 along B—B.
Figure 6:
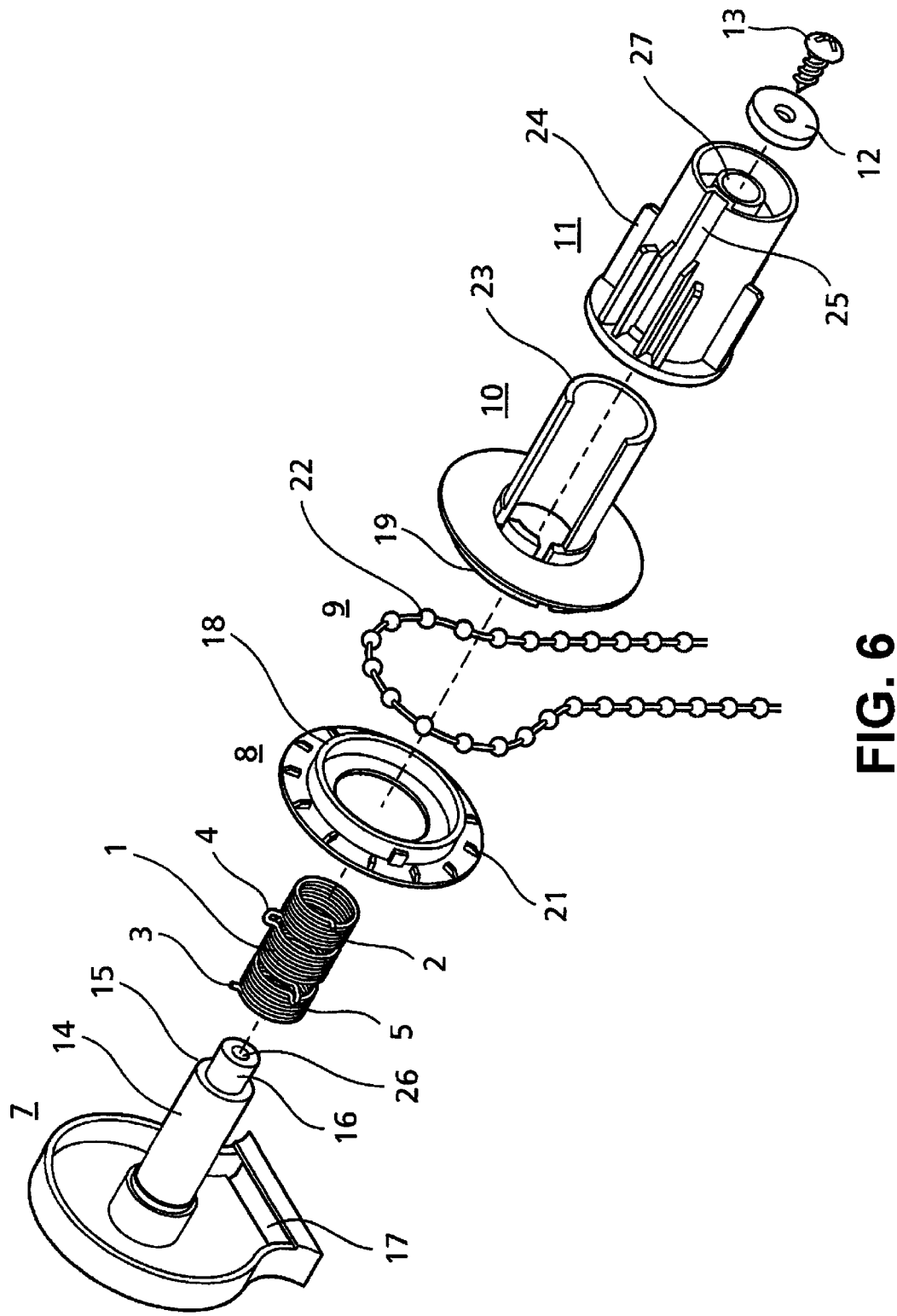
FIG. 6 is an assembly view of a spring clutch incorporating the spring of FIG. 1.

The skilled addressee will also appreciate that an end view of the spring of FIG. 1 would be the same as that depicted in FIG. 3.

The helical spring is typically manufactured from spring steel. The spring is formed by machinery which is programmed to form (for example) the left hand wound section A in the spring material. It then reverses the winding adjacent one end of the left hand wound section A to form the tab 5 and then forms the right hand wound section B. Thereafter, tab 4 is formed followed by a left hand section C. A final tab 2 is formed at the end of the left hand would section C. As depicted in FIGS. 2 to 5, the formation of the tabs and the windings can be repeated for a predetermined number of times depending on the length of the hub on which the spring will be mounted and the load of the blind.
(b) Description of the spring clutch In FIGS. 6 to 9, a spring clutch 6 is depicted at various stages of assembly.

Spring clutch 6 includes a housing 7 having a central hub (first shaft) 14, the helical spring 1, a pulley cover 8, a pull cord 9, a pulley base (second shaft) 10, a roller cover (third shaft) 11, a washer 12 and a fixing screw 13.

More particularly, the central hub 14 has a shoulder 15 at one end, and the housing 7 has a recessed area 16. The central hub 14 is destined to receive the pulley cover 8, the pull cord 9 and pulley base 10. An opening 17 is formed in the base of the housing 7 through which the pull cord 9 passes as clearly shown in FIG. 6.

Figure 7:
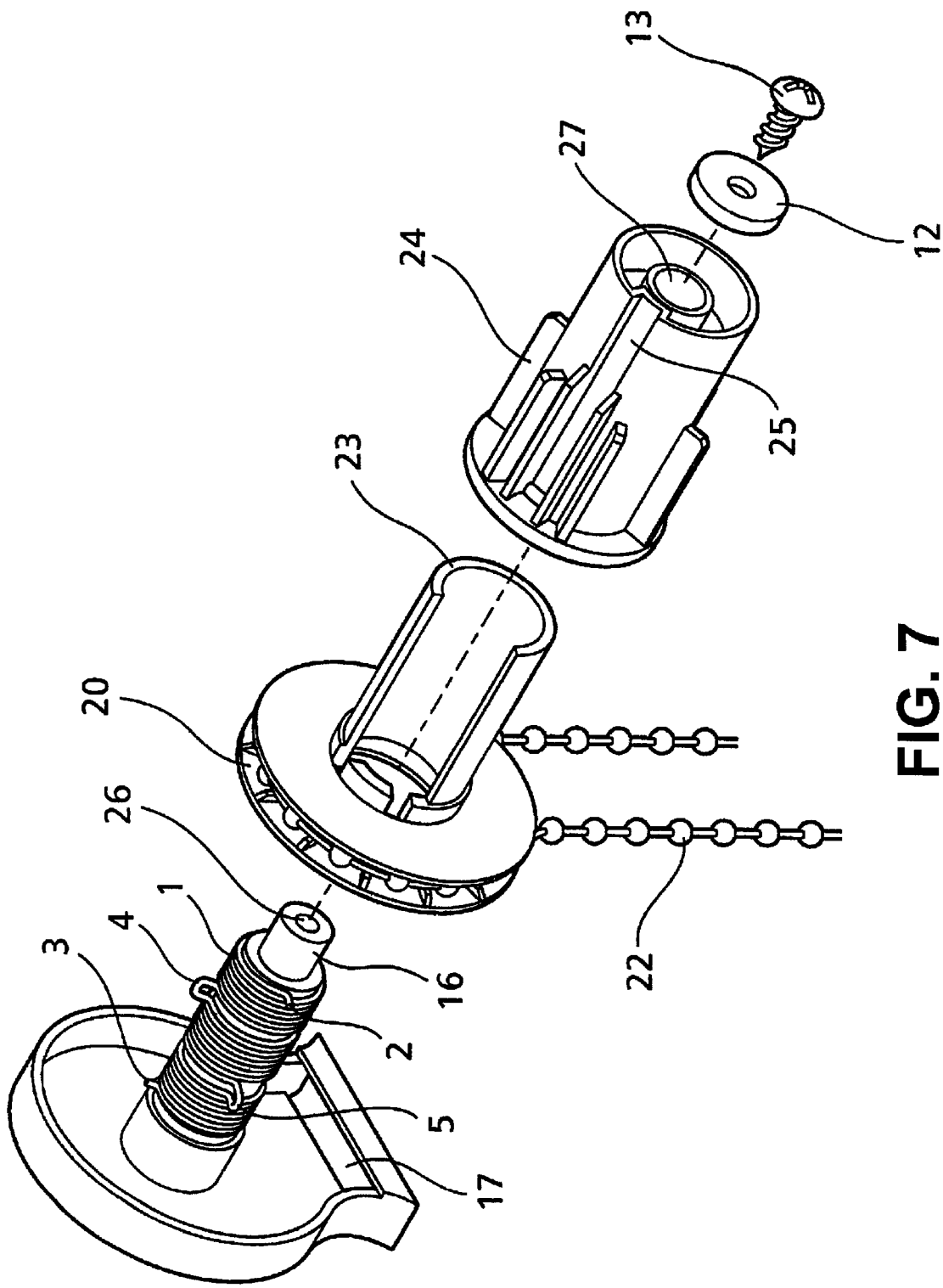
FIG. 7 is a partial assembled view of the spring clutch of FIG. 6.

Helical spring 1 has an inner diameter which is smaller than the outer diameter of the central hub 14. By increasing the difference between these diameters, it is possible to increase the frictional engagement between the helical spring 1 and the hub 14 to a predetermined level. The spring 1 is expanded and slides onto hub 14 so that it does not still extend past shoulder 15 as shown in FIG. 7.

The pulley cover 8 and pulley base 10 have engaging bosses 18 and 19 to form a circumferential groove 20. The groove 20 has a number of radial flutes 21. The distance between the radial flutes corresponds approximately to the distance between the balls 22 on the pull cord 9. As shown in FIG. 7, the balls 22 sit in between the flutes 21 and cause the pulley cover 8 and pulley base 10 to rotate when one end of the pull cord 9 is placed under tension.

Figure 8:
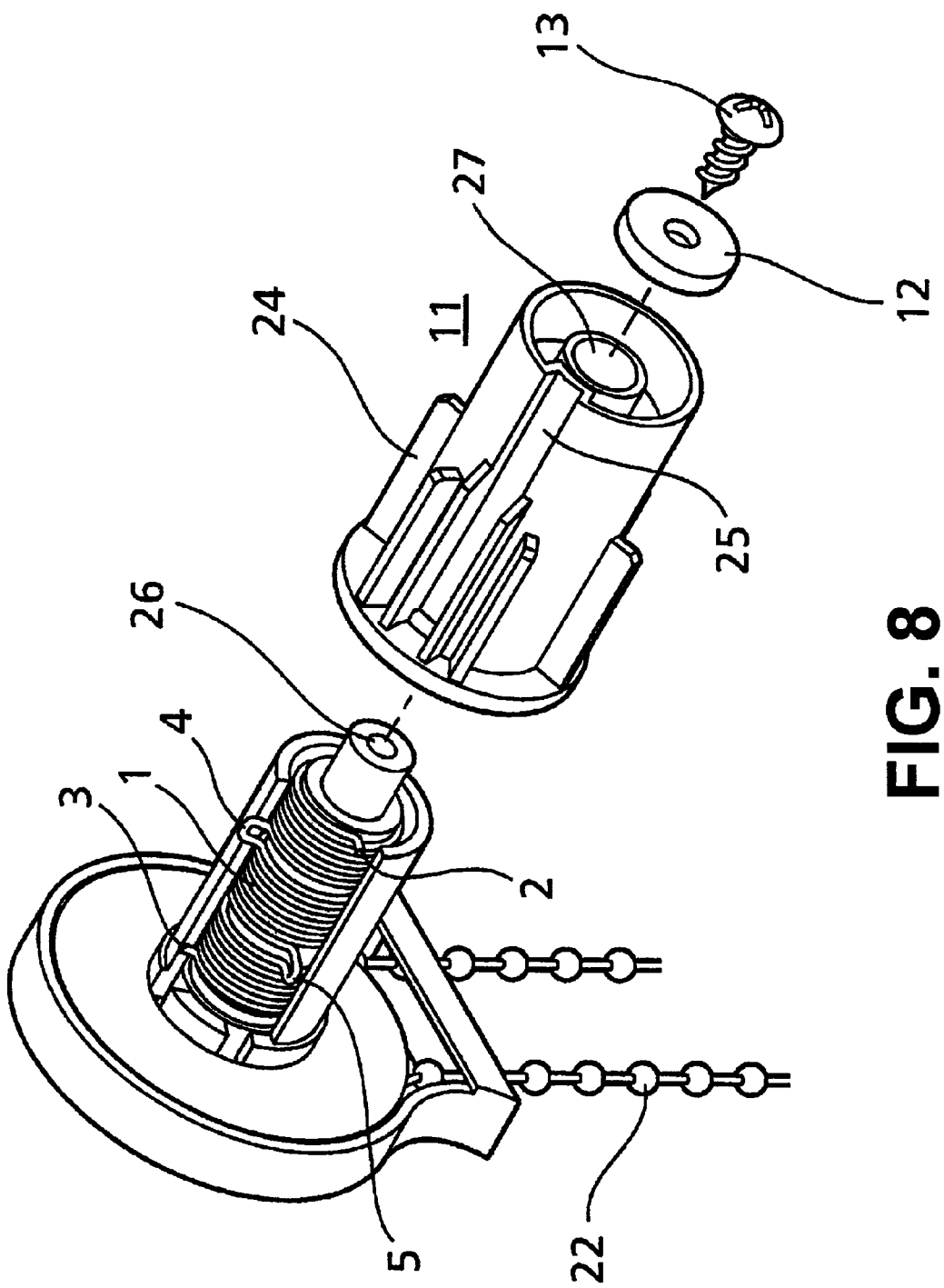
FIG. 8 is a further partial assembled view of the spring clutch of FIG. 6.
Figure 9:
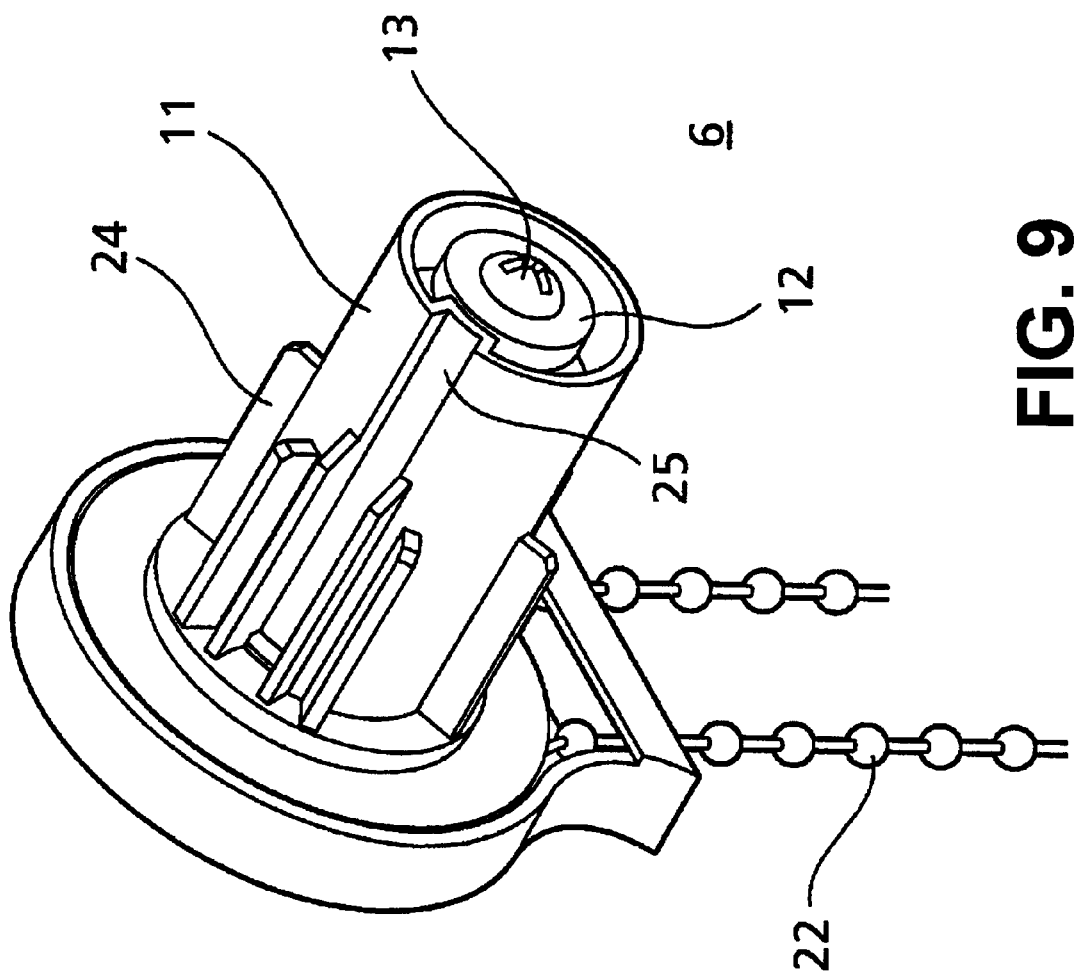
FIG. 9 is a fully assembled view of the spring clutch of FIG. 6.

Pulley base 10 also has a tubular extension 23 with a portion of the circumferential wall removed to form an opening. As shown in FIG. 8, the tabs 2, 3, 4 and 5 of the helical spring 1 extend into the opening. Tabs 2 and 5 are axially aligned. Tabs 3 and 4 are also axially aligned. The circumferential distance between the sets of aligned tabs is less than the circumferential distance of the opening in the tubular extension 23. Although in the embodiment of the invention depicted in FIGS. 6 to 9 the tabs are shown in alignment, it is again to be understood by the skilled person that such alignment is only preferred.

Roller cover 11 has an outer configuration to receive the inner roll of a blind (not shown) and includes a number of radial fins 24. As more clearly shown in FIG. 9, the roller cover 11 also has an inwardly extending keyway 25. When the roller cover 11 is encircles tubular extension 23, keyway 25 is located in the opening in tubular extension 23 and is positioned in between the sets of aligned tabs 2, 5 and 3, 4. In this position the end 26 of central hub 14 enters the opening 27 of roller cover 11. Fixing screw 13 passes through washer 12 and enters the end 26 of hub 14 to fix the spring clutch 6 together.
(b) Description of the operation of the spring clutch FIGS. 10 and 11 show a cross-section of the assembled spring clutch of FIGS. 6 to 9.

Figure 10:
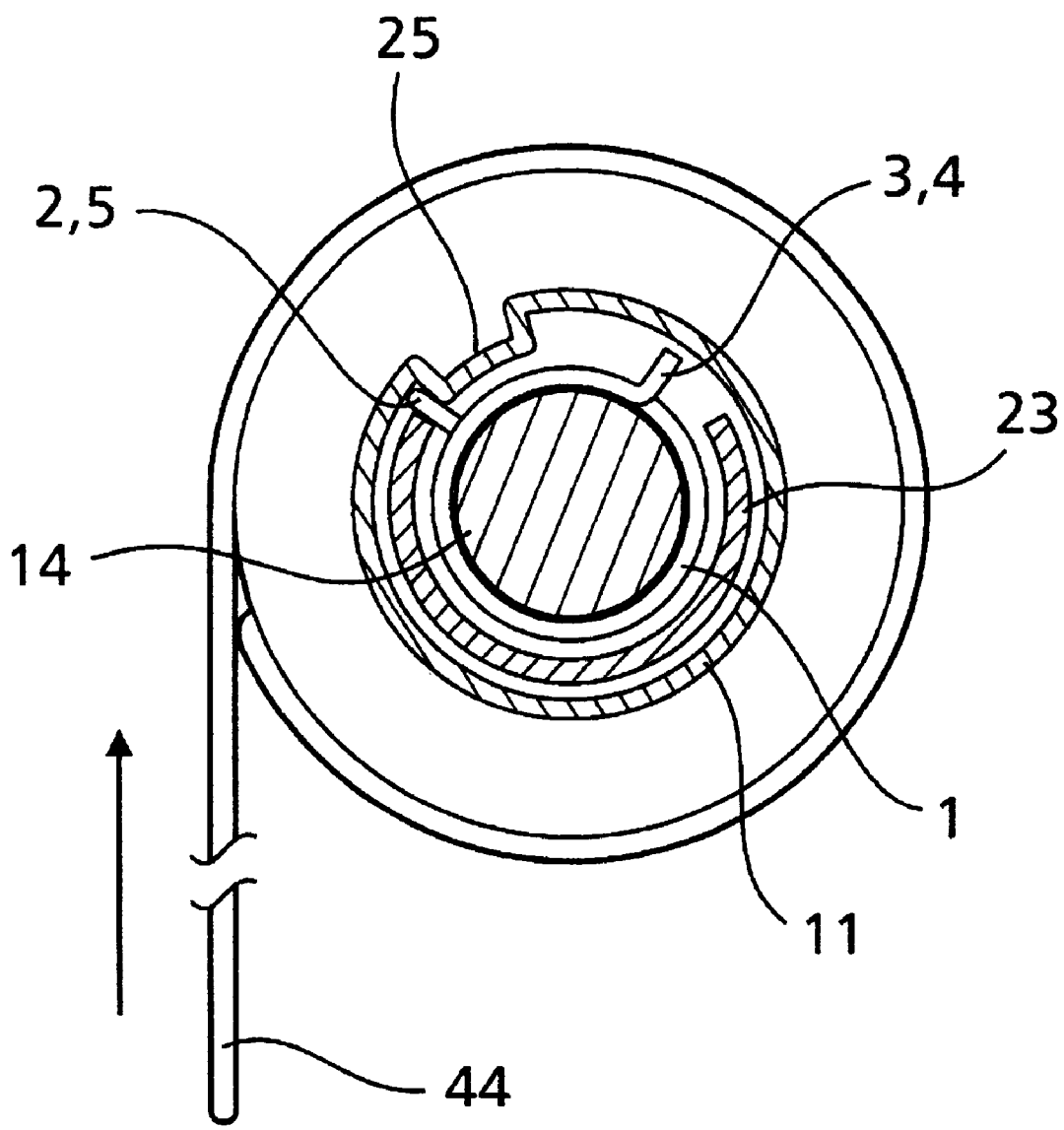
FIGS. 10 and 11 are cross-sectional views of the spring clutch of FIG. 9 through the line A—A in varying positions.
Figure 11:
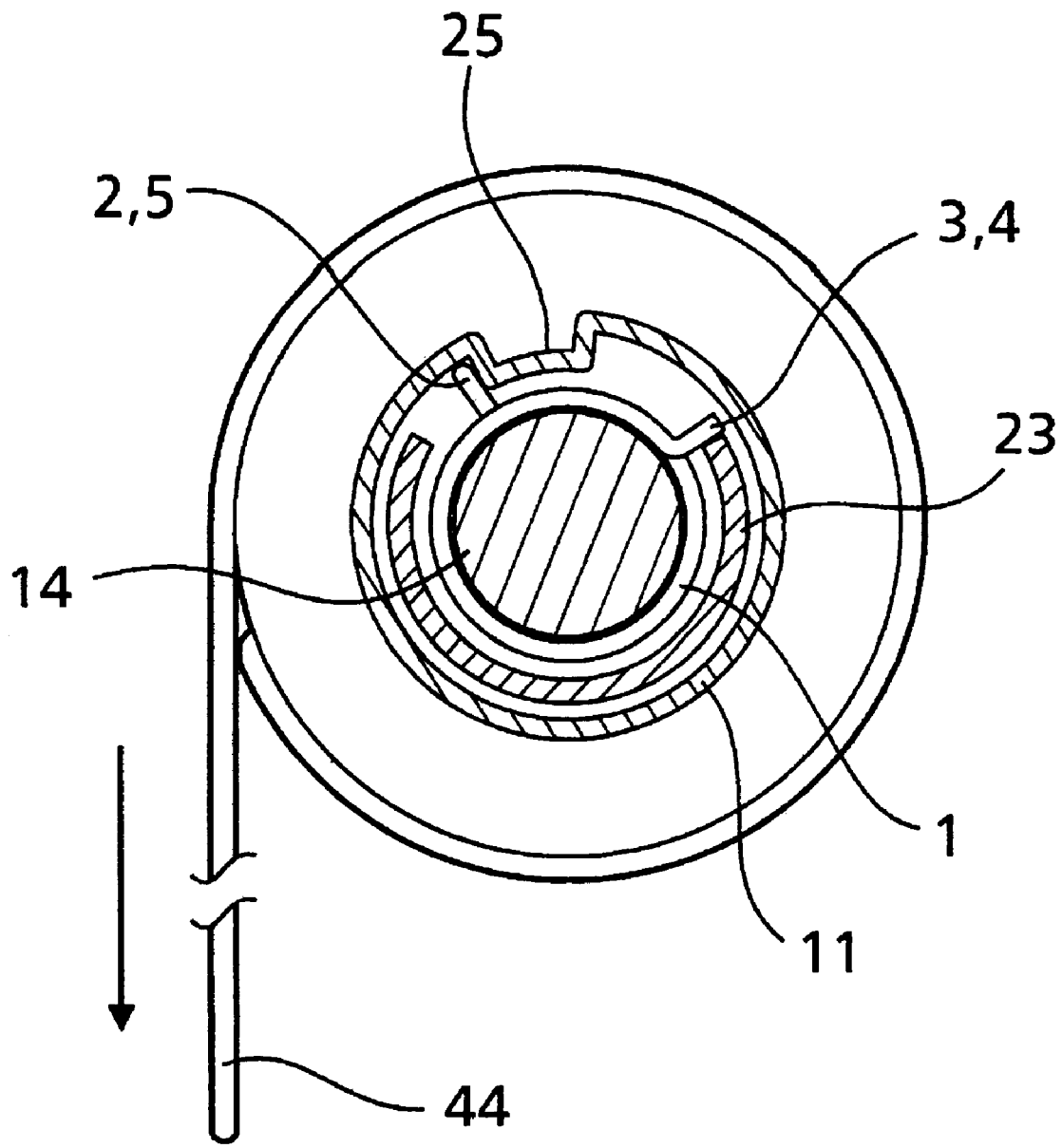

FIG. 10 demonstrates the blind 44 whilst it is going up and in the completely wound up position, while FIG. 11 is included to show the blind whilst it is going down and in the wound down position.

(i) Completely wound down position of the blind (FIG. 11)

In the wound down position of FIG. 11, the force exerted upon the clutch is principally provided by the weight of the suspended blind 44. Keyway 25 of the roller cover 11 is urged by this weight against tabs 2 and 5 of spring 1 to expand and tighten spring 1 about the stationary hub 14 which causes the clutch to resist further rotation of the roller cover 11. In this position tubular extension 23 does not exert a force on either tabs 2 and 5 or tab 3 and 4 and does not play a role in maintaining the blind 44 in the position shown in FIG. 11.

(ii) Winding up of the blind (FIG. 10)

In this motion, a rotational force is exerted on keyway 25 of roller cover 11 by tubular extension 23 via tabs 2 and 5 to wind the blind up. This is initiated by pulling pull cord 9 (not shown). A counter-rotational force is exerted by the weight of the suspended blind 44 on tabs 2 and 5 via keyway 25. When the rotational force exceeds the counter-rotational force, tabs 2 and 5 of spring 1 expand spring 1 to disengage the stationary hub 14 permitting the roller cover 11 to roll up blind 44.

(iii) Completely wound up position of the blind (FIG. 10)

In this position, a rotational force exerted on keyway 25 of roller cover 11 by the tubular extension 23 has ceased. However, the counter-rotational force is still exerted by the weight of the remaining portion of the suspended blind 44 via keyway 25 onto the tabs 2 and 5. Accordingly, the keyway 25 moves tabs 2 and 5 of spring 1 counter-clockwise to tighten spring 1 about the stationary hub 1 which causes the clutch to resist further rotation of the roller cover 11. The blind 44 is therefore held in position.

(iv) Winding down the blind (FIG. 11)

In this position, the force exerted upon the clutch is twofold. The first is due to the weight of the lengthening mass of the suspended blind 44. Keyway 25 of the roller cover 11 is urged by this force against tabs 2 and 5 of spring 1 which tends to tighten the spring 1 about the hub 14. However, a second rotational force is applied to roller cover 11 by tubular extension 23 against tabs 3 and 4. This rotation tends to release spring 1 by reducing the effect of the keyway 25 on tab 3 and 4 and permits the blind to be lowered.

Consequently, the spring clutch of the invention is bidirectional and provides smooth rotation of the roller cover and consequently the blind.

Whilst the invention has been described with reference to particular embodiments, it is to be understood that the invention is not so limited. It is also to be understood by those skilled in the technology that many variations or modifications in details of design or construction may be made without departing from the essence of the present invention. Therefore, the invention should be understood to include all such variations and modifications within its scope.

I claim:

1. A helical spring for a spring clutch, comprising:
   at least a first right hand wound section and a second right hand wound section;
   at least one left hand wound section positioned between the first and second right hand wound sections; and
   tabs projecting from the first and second right hand wound sections and the left hand wound section.

2. The helical spring of claim 1, wherein the tabs project outwardly.

3. The helical spring of claim 1, wherein the first and second right hand wound sections are the only right hand wound sections.

4. The helical spring of claim 1, further comprising at least one second left hand wound section positioned so that the second right hand wound section is between the second left hand wound section and the first right hand wound section.

5. The helical spring of claim 1, wherein the first right hand wound section abuts the at least one left hand wound section.

6. The helical spring of claim 5, wherein one of the tabs connects the first right hand wound section and the at least one left hand wound section.

7. A helical spring for a spring clutch, comprising:
   at least a first left hand wound section and a second left hand wound section;
   at least one right hand wound section positioned between the first and second left hand wound sections; and
   tabs protecting from the first and second left hand wound sections and the right hand wound section.

8. The helical spring of claim 7, wherein the first and second left hand wound sections are the only left hand wound sections.

9. The helical spring of claim 7, further comprising at least one second right hand wound section positioned so that the second left hand wound section is between the second right hand wound section and the first left hand wound section.

10. The helical spring of claim 7, wherein the first left hand wound section abuts the at least one right hand wound section.

11. The helical spring of claim 10, wherein one of the tabs connects the first left hand wound section and the at least one right hand wound section.

12. The helical spring of claim 7, wherein the tabs project radially outward.

13. The helical spring of any one of claims 1–12, wherein the tabs are substantially radial projections.

14. The helical spring of claim 13, wherein at least two of the tabs are axially offset from each other.

15. The helical spring of claim 13, wherein at least two of the tabs are axially substantially aligned.

16. A spring clutch comprising:
   (i) a first shaft;
   (ii) a helical spring according to claim 13, frictionally engaging the first shaft; and
   (iii) a controller adapted to cause engagement or disengagement of the helical spring to or from the first shaft.

17. The helical spring of any one of claims 1–12, wherein at least two of the tabs are axially offset from each other.

18. The helical spring of claim 17, wherein at least two of the tabs are axially substantially aligned.

19. A spring clutch comprising:
   (i) a first shaft;
   (ii) a helical spring according to claim 17, frictionally engaging the first shaft; and
   (iii) a controller adapted to cause engagement or disengagement of the helical spring to or from the first shaft.

20. The helical spring of any one of claims 1–12, wherein at least two of the tabs are axially substantially aligned.

21. A spring clutch comprising:
   (i) a first shaft;

(ii) a helical spring according to claim 20, frictionally engaging the first shaft; and (iii) a controller adapted to cause engagement or disengagement of the helical spring to or from the first shaft.

22. A spring clutch comprising:

(i) a first shaft;

(ii) a helical spring according to any one of claims 1–12, frictionally engaging the first shaft; and (iii) a controller adapted to cause engagement or disengagement of the helical spring to or from the first shaft.

23. The spring clutch of claim 22, wherein the controller selectively moves one or more of the tabs to tighten or loosen the helical spring about the first shaft.

24. A spring clutch comprising:

a first shaft:

a helical spring frictionally engaging the first shaft, the helical spring including at least one right hand wound section, at least one left hand wound section, tabs projecting from both the right hand wound section and the left hand wound section; and a controller adapted to cause engagement or disengagement of the helical spring to or from the first shaft, the controller including a second shaft rotatable to loosen the helical spring on the first shaft, and a third shaft rotatable to tighten the helical spring on the first shaft.

* * * * *